United States Patent [19]

Warner

[11] 4,379,947

[45] Apr. 12, 1983

[54] SYSTEM FOR TRANSMITTING DATA SIMULTANEOUSLY WITH AUDIO

[75] Inventor: Paul Warner, Port Washington, N.Y.

[73] Assignee: Teleprompter Corporation, New York, N.Y.

[21] Appl. No.: 9,187

[22] Filed: Feb. 2, 1979

[51] Int. Cl.³ .......... H04H 5/00; H04J 1/14

[52] U.S. Cl. .......... 179/1 GD; 370/76; 370/11; 370/69.1

[58] Field of Search .......... 179/15 R, 15 BC, 15 BW, 179/1 GB, 1 GD; 325/36; 455/45, 70; 370/11, 69.1, 76, 110.1, 119, 19

[56] References Cited

U.S. PATENT DOCUMENTS

| | | | |
|---|---|---|---|
| 2,615,986 | 10/1952 | Kalfaian | 179/15 R |
| 3,122,610 | 2/1964 | Csicsatka | 179/1 GD |
| 3,160,812 | 12/1964 | Scantlin | 325/30 |
| 3,317,838 | 5/1967 | Ham | 325/31 |
| 3,406,343 | 10/1968 | Mehlman | 325/40 |
| 3,486,117 | 12/1969 | Groves et al. | 325/30 |
| 3,603,882 | 9/1971 | Wilson | 179/15 BC |
| 3,683,277 | 8/1972 | Kuller et al. | 325/30 |
| 3,701,946 | 10/1972 | Anderson | 325/64 |
| 3,706,945 | 12/1972 | Yanagidaira et al. | 332/17 |
| 3,714,375 | 1/1973 | Stover | 179/2 E |
| 3,760,274 | 9/1973 | Vogt | 325/26 |
| 3,773,979 | 11/1973 | Kirk et al. | 179/15 FD |
| 3,778,718 | 12/1973 | Bass et al. | 325/139 |
| 3,792,199 | 2/1974 | Saeki | 179/15 BT |
| 3,824,468 | 7/1974 | Zegers et al. | 325/32 |
| 3,824,470 | 7/1974 | Eastmond | 325/45 |
| 3,842,196 | 10/1974 | Loughlin | 358/12 |
| 3,845,391 | 10/1974 | Crosby | 325/64 |
| 3,875,512 | 4/1975 | Baranyi et al. | 325/67 |
| 4,024,342 | 5/1977 | Croiser et al. | 178/67 |
| 4,048,619 | 9/1977 | Forman | 325/36 |

*Primary Examiner*—Douglas W. Olms

*Attorney, Agent, or Firm*—Schuyler, Banner, Birch, McKie & Beckett

[57] ABSTRACT

An FM broadcasting system is disclosed for transmitting a data signal simultaneously with an auxiliary audio program on the same subcarriers of an FM transmission channel. The main program is transmitted on the FM transmission channel carrier and the auxiliary audio program, which may be background music, is transmitted on the subcarriers in a conventional manner. According to the present invention, the data signal, which is added to the auxiliary audio program, is a binary digital information signal. This binary digital information signal is used to generate a signal which modulates the phase and amplitude of a data reference signal. The resulting phase transition of the modulated data reference signal represents the binary value of the binary digital information signal. The amplitude of the modulated data reference signal then is adjusted in an automatic gain control amplifier relative to the amplitude of a corresponding frequency range of the auxiliary audio program. This amplitude adjusted signal is combined in a linear summing network with the auxiliary audio program and transmitted over the FM transmission channel. The receiver is capable of receiving one or more of the main program, the auxiliary audio program and the data signal.

23 Claims, 7 Drawing Figures

TRANSMITTER UNIT

TRANSMITTER UNIT

RECEIVER UNIT

SIDE BAND ENERGY DISTRIBUTION

DATA SOURCE WAVE FORMS

SUMMING CIRCUIT-16 (FIG.1)

DATA RECEIVER-25 (FIG.2)

SYSTEM FOR TRANSMITTING DATA SIMULTANEOUSLY WITH AUDIO

BACKGROUND OF INVENTION

The present invention is directed to an FM broadcasting system in which an auxiliary audio program and a data signal are transmitted on a subcarrier of an FM transmission channel.

A number of systems have been developed for transmitting auxiliary programs together with the main program being broadcast on an FM transmission channel. Commercial FM broadcast stations can now broadcast a number of programs in addition to the main program including FM stereo multiplex or other programs transmitted in the SCA (Subsidiary Communications Authorization) band. These commercial FM broadcast stations normally transmit the main program on the transmission channel carrier and provide background music or other auxiliary programs for subscribers in the SCA bands.

Examples of broadcasting systems in which the subcarriers of an FM transmission channel are used to transmit auxiliary programs can be found in the patent literature. In U.S. Pat. No. 3,122,610, an FM stereo multiplex transmission system is shown in which an auxiliary program, such as background music, is transmitted on a 67 KHz subcarrier with a frequency deviation of ±8 KHz. Thus, since the SCA band is defined as a frequency band in the range 58–75 KHz (centered at 67 KHz), this patent shows the use of the SCA band for the transmission of an auxiliary audio program. Similar uses of an FM transmission channel are described in U.S. Pat. No. 3,317,883; U.S. Pat. No. 3,534,266; and U.S. Pat. No. 3,980,954. Auxiliary programs also can be transmitted in available frequency bands in a similar manner in an AM broadcasting system as shown in U.S. Pat. Nos. 3,160,812 and 3,714,375; a microwave communication system as shown in U.S. Pat. No. 3,773,979; and a TV video system as shown in U.S. Pat. No. 3,842,196. Thus, different techniques are known in the art for transmitting auxiliary programs over subcarriers in various transmission systems.

In some prior art FM broadcasting systems, the auxiliary program includes an audio signal as well as other information which also can be transmitted on the subcarriers of the FM transmission channel. For example, it is known in the prior art to interrupt an auxiliary program such as background music with commercial messages intended for selected customers. The commercial messages usually are preceded or accompanied by an address code which designates the selected customer. One such system is disclosed in U.S. Pat. No. 3,922,607 in which an auxiliary audio program (background music) is transmitted on one subcarrier in the SCA band and a plurality of sequential messages, accompanied by coded signals, are transmitted on a second subcarrier. The sequential messages only interrupt the background music at the receiver designated by the coded signals. A similar system is disclosed in U.S. Pat. No. 3,714,575 in which the background music is periodically interrupted by speech signals. In both these patents, different subcarriers are used for the background music and the other information signals. However, the subcarrier having the information signals includes both the message/speech signals and the code signals on a time share basis.

Although the above prior art broadcasting systems provide a more efficient use of the FM frequency band, none of these prior art systems provides an efficient method for transmitting a data signal, such as digital information, on the SCA band in addition to an auxiliary audio program, such as background music. Time sharing broadcasting systems are impracticed for transmission of both background music and digital information because an interruption occurs in the transmission of the background music. Alternatively, the SCA band in an FM broadcasting system could be divided between an auxiliary audio signal and a data signal. However, by dividing the SCA band, a narrow bandwidth results for both the auxiliary audio program and the data signal. Therefore, even though large mass users have a need for both an auxiliary audio program and digital information, it has not been practical to transmit a data signal such as digital information and an auxiliary audio program on the same subcarriers in the SCA band in an FM broadcasting system.

SUMMARY OF INVENTION

It is a primary object of the present invention to provide an FM broadcasting system for using subcarriers in the SCA band to transmit a data signal simultaneously with an auxiliary audio program such as background music. In this regard, it is an object of the present invention to mix the data signal with the auxiliary audio program with no deleterious effect on the transmission and reception of the auxiliary audio program.

It is a further object of the present invention to provide an FM broadcasting system for transmitting both an auxiliary audio program and a data signal in the SCA band for use by mass users of multiple listing services, business reports, digital computer information, etc. An additional object is to provide both the auxiliary audio program and the data signal to particular mass users while at the same time transmitting a monaural or multiplex stereo program on the main FM transmission channel.

The FM radio broadcasting system of the present invention transmits a main program, an auxiliary audio program and a data signal on the same FM transmission channel. The auxiliary audio program and the data signal are simultaneously transmitted on the same subcarriers, preferably in the SCA band, without any appreciable deleterious effect on the auxiliary audio program. The FM radio broadcasting system includes a data source for generating a modulated data transmit reference signal which is modulated in accordance with the data signal. The amplitude of the modulated data transmit reference signal then is adjusted relative to the amplitude of a corresponding frequency band of the auxiliary audio program. This amplitude adjusted signal together with the auxiliary audio program modulates subcarriers of the FM transmission channel for transmission, together with the main program, over the FM transmission channel. The receiver, which can detect both the main program and the auxiliary audio program in the usual manner, includes a data receiver for detecting the data signal.

The transmitter unit of the present invention includes a data source and a summing circuit for combining the data signal, which may be a binary digital information signal, and the auxiliary audio program. The digital information signal is first converted to serial form and supplied to the control gate of an analog switch. The analog switch has a signal input which is coupled to a sinusoidal data clock signal. The data source also includes a phase/amplitude modulator for modulating the phase and amplitude of the data transmit reference signal in accordance with the digital information signal. The phase transition of the modulated data reference signal indicates the binary value of the digital information signal. The phase/amplitude modulator phase modulates the data transmit reference signal in accordance with the 180° phase change of the output signal of the analog switch. In other words, the phase transition of the modulated data reference signal indicates whether the digital information is a zero or one. The modulated data reference signal then passes through a low pass filter which suppresses the data reference carrier signal and the upper sidebands of the modulated data reference signal. The amplitude of the lower sidebands of the modulated data reference signal is then adjusted in relation to a corresponding frequency band of the auxiliary audio program. The amplitude adjusted lower sidebands of the modulated data reference signal is linearly added to the auxiliary audio program and transmitted to the receiver in the usual manner.

DETAILED DESCRIPTION OF THE PREFERRED EMBODIMENT

Figure 1:
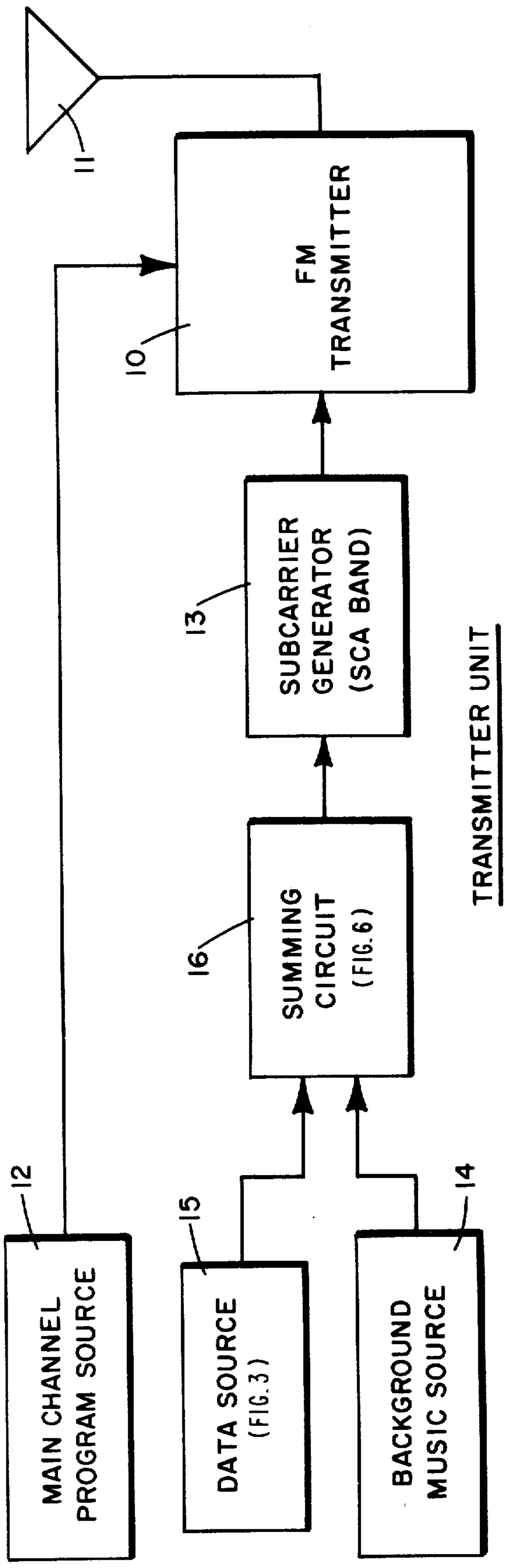
FIG. 1 is a block diagram of the transmitter unit of the FM radio broadcasting system of the present invention.

Reference is made to the drawings which illustrate the preferred embodiment of the present invention and particularly to FIG. 1 which is a block diagram of the transmitter unit. An FM transmitter 10 is connected to antenna 11 and includes a main channel program source 12 for broadcasting the main program on one of the FM transmission channels of the FM transmitter 10. The main program is the FM program normally received on conventional FM receivers.

As is generally known in the FM broadcasting art, the FM transmitter 10 may also broadcast several programs on subcarriers of the FM transmission channels. These subcarriers are generally at specified frequencies authorized by the Federal Communications Commission (FCC) under the Subsidiary Communications Authorization (SCA). The FCC allows the broadcast of auxiliary programs such as background music, commercial messages, educational material, etc. on the subcarriers in the so-called SCA band. Reception of these auxiliary programs on the SCA band requires additional equipment within the FM receiver and, as a result, these auxiliary programs are usually provided on a subscriber basis.

As shown in FIG. 1, the transmitter unit also includes an FM subcarrier generator 13 which generates an FM subcarrier for modulating the FM carrier signal of the FM transmitter 10. In the preferred embodiment, subcarrier generator 13 generates a subcarrier at the center frequency (67 KHz) of the SCA band (58 to 75 KHz). The FM subcarrier generated by the subcarrier generator 13 is modulated by the auxiliary audio program, which in the preferred embodiment is background music provided by the background music source 14. The techniques for modulation of the subcarrier by background music are generally known in the art.

In addition, the FM subcarrier is modulated by a data signal such as a digital information signal generated by the data source 15. Details of this data source 15 will be described below with reference to FIGS. 3–4. The digital information signal is used to generate a modulated data reference signal which is combined with the auxiliary audio program in the summing circuit 16. As described below with reference to FIG. 6, the summing circuit 16 adds the modulated data reference signal to the auxiliary audio program so that the digital information contained in the data signal and the auxiliary audio program are simultaneously transmitted on the same subcarrier of the FM transmission channel.

Figure 7:
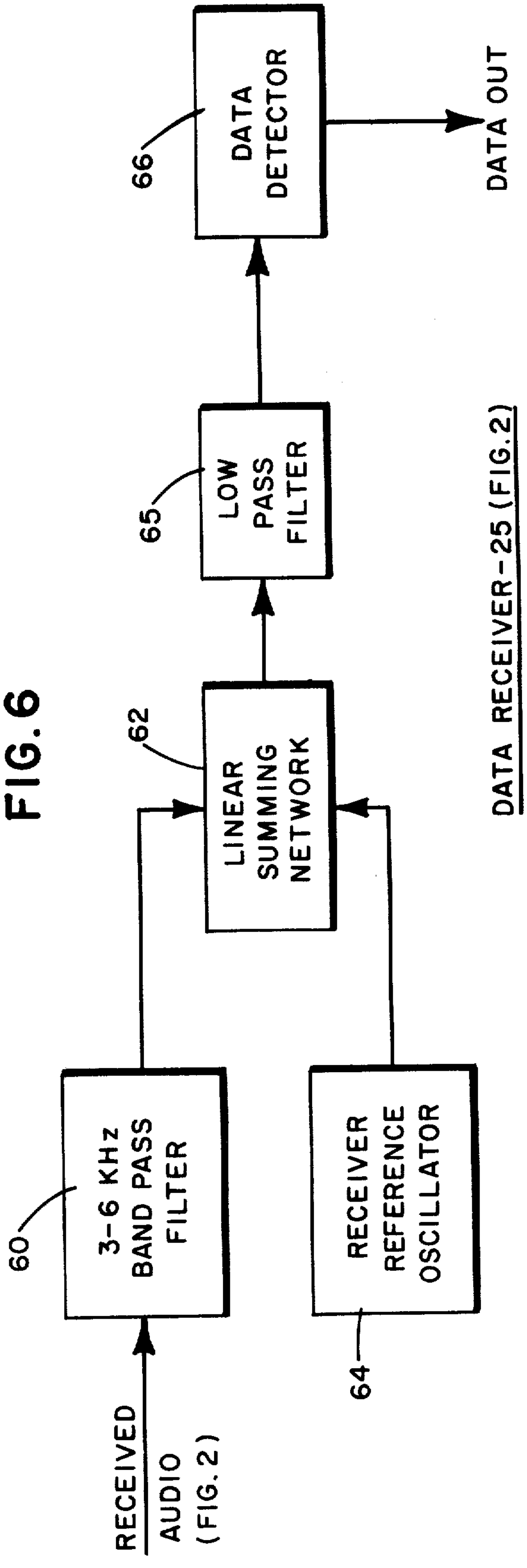
FIG. 7 is a block diagram of the data receiver of the receiver unit shown in FIG. 2.

As a result, the transmitter unit shown in FIG. 1 is capable of transmitting a continuous public broadcast on the main FM transmission channel, a continuous auxiliary audio program such as background music on an FM subcarrier and a digital information signal on the same subcarrier. A conventional FM receiver unit receives the main channel program and a specialized FM receiver unit, which may be available only on a subscription basis, receives the auxiliary audio program and the digital information signal. Although specialized FM receiver units for the detection of an auxiliary audio program, such as background music, are generally known in the art, specialized FM receiver units for detection of digital information signals form part of the present invention as described below with reference to FIG. 7.

Figure 2:
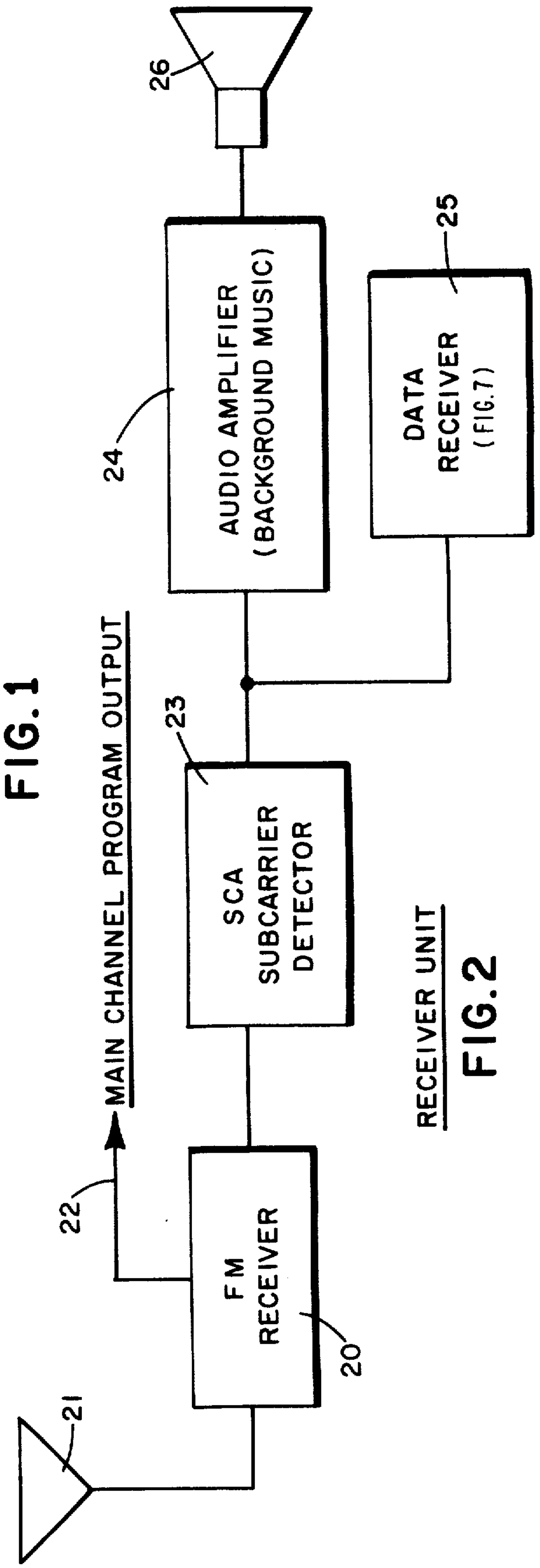
FIG. 2 is a block diagram of a receiver unit for receiving signals transmitted by the transmitter unit of FIG. 1.

The receiver unit of the present invention is shown in block diagram form in FIG. 2. The receiver unit includes an FM receiver 20 connected to a receiving antenna 21. The FM receiver 20 includes a main channel program output 22 which generates the main channel program in a conventional manner. The FM receiver 20 is also connected to a subcarrier detector 23 which detects the auxiliary audio program and the data signal transmitted on the FM subscriber in the SCA band. The subcarrier detector 23, which is a conventional unit, has an output which is connected to the audio amplifier 24 and a data detector 25. The audio amplifier 24 amplifies the auxiliary audio program (background music) for broadcast over the speaker 26. The data receiver 25 generates a data signal corresponding to the data signal transmitted by the transmitter unit of FIG. 1. As mentioned above, the details of the data receiver 25 will be discussed in further detail below.

Figure 3:
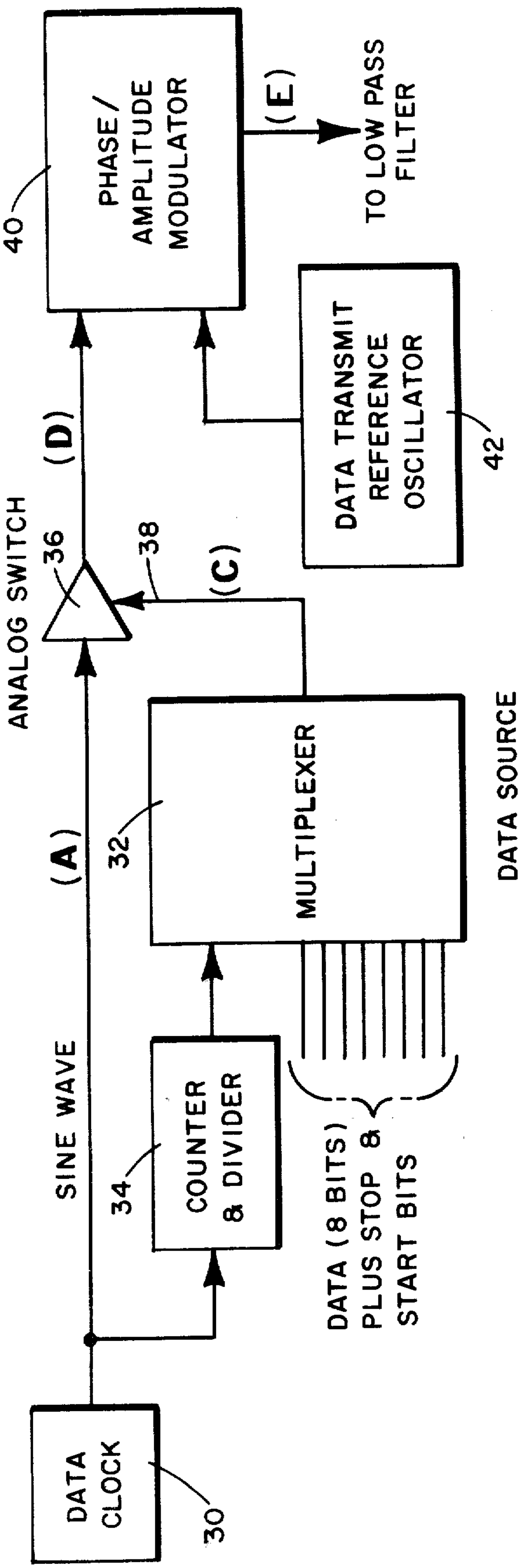
FIG. 3 is a block diagram of the data source shown in FIG. 1.
Figure 4:
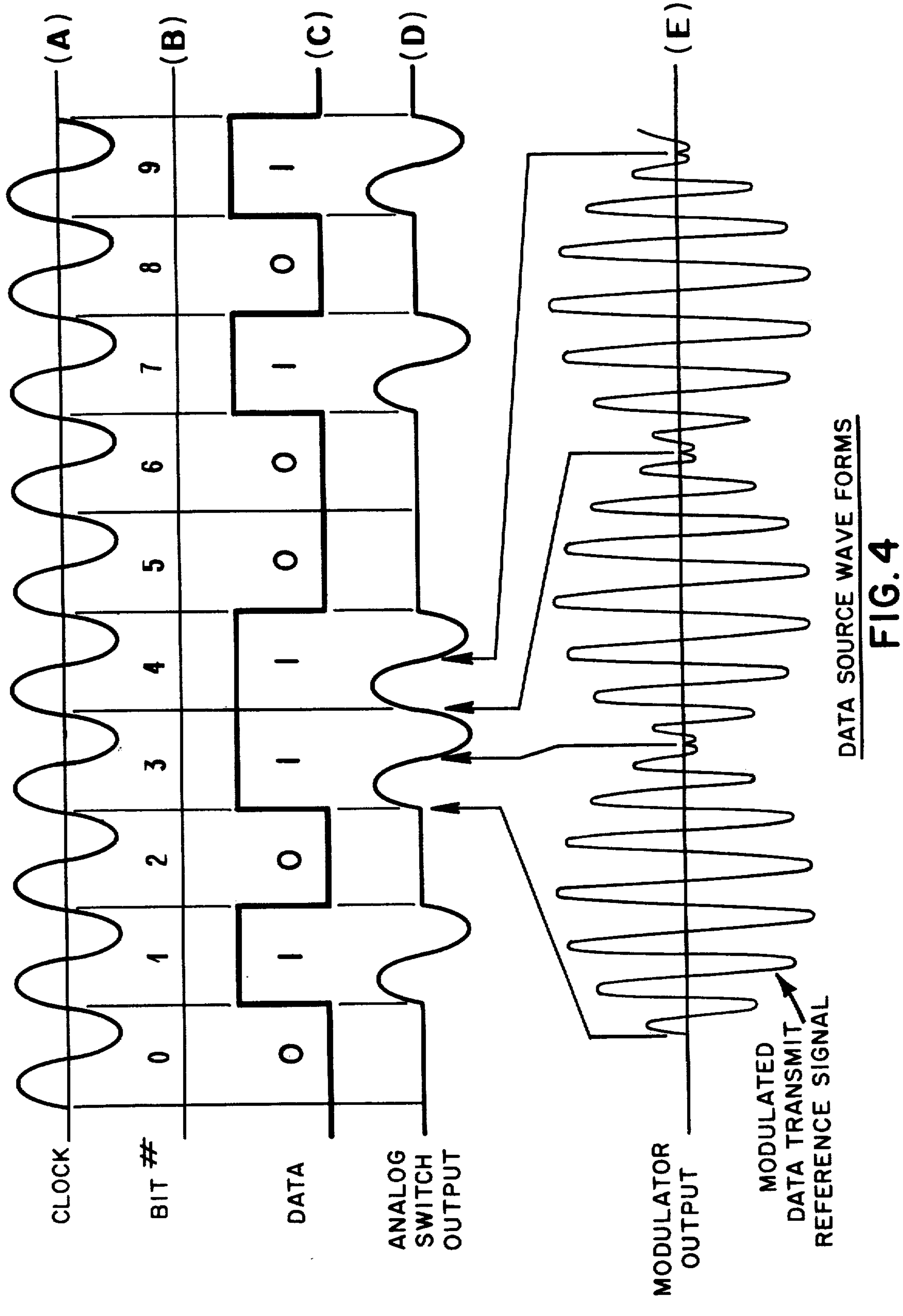
FIG. 4 illustrates the wave forms of the data source shown in FIG. 3.

The data source 15 is shown in detail in FIG. 3 and the waveforms generated by the data source are shown in FIG. 4. The incoming data signal is in the form of a parallel digital information signal containing 8 data bits plus stop and start bits. Although the incoming digital information signal is shown in parallel form, it should be recognized that an incoming serial digital information signal can also be used. The data source 15 includes a data clock 30 which generates the data clock signal of waveform A of FIG. 4. Ten cycles of the sine wave of waveform A are shown corresponding to 8 bits of data plus the start and stop bits generally used in asynchronous type transmission. The use of a sine wave as the data clock signal reduces the bandwidth requirements of the data source 15. Also, as illustrated by waveform B of FIG. 4, one cycle of the data clock signal corresponds to an information bit of the digital information signal. The data clock 30 is a conventional element which need not be described in further detail herein. In the preferred embodiment, a monolithic function generator XR-2206 manufactured by Exar Corporation is used as the data clock 30.

The parallel digital information signal is first converted to serial form as illustrated by waveform C of FIG. 4. The parallel digital information signal is coupled to a multiplexer 32 which is a conventional element. In the preferred embodiment, the multiplexer 32 is a channel data selector MC14512 manufactured by Motorola Semiconductors, Inc. The multiplexer 32 is connected to the counter/divider circuit 34 which enables the multiplexer 32 to select one of eight signal input lines coupled to the parallel digital information signal. In the preferred embodiment, the counter/divider circuit 34, which is conventional, is formed by the combination of a voltage comparator LM3302 manufactured by National Semiconductor, which receives the data clock signal and generates a square wave coincident with the zero crossings of the data clock signal, and a BCD counter MC14518B manufactured by Motorola Semiconductors, Inc. The BCD counter provides a count signal to the multiplexer 32 which enables the multiplexer 32 to convert the parallel digital information signal to a serial digital information signal as illustrated by waveform C of FIG. 4.

The data clock signal of waveform A also is coupled to the input of an analog switch 36. The analog switch 36 includes a control gate 38 which is coupled to the serial digital information signal of waveform C. As a result, the serial digital information signal controls the operation of the analog switch 36 and permits it to pass cycles of the data clock signal coincident with the proper binary value of the digital information signal. Since the bits of the serial digital information signal of waveform C coincide with the cycles of the data clock signal of waveform A, the analog switch 36 has an output signal as illustrated in waveform D of FIG. 4. Whenever the binary value of the digital information signal is "1", the output signal of the analog switch 36 contains a full cycle of the data clock signal. Of course, the opposite relationship between the binary values of the digital information signal and the output signal of the analog switch 36 could be used. The analog switch 36 is also a conventional element which in the preferred embodiment is the MC14016B manufactured by Motorola Semiconductors, Inc.

The output signal (waveform D) of the analog switch 36 is coupled to the input of the phase/amplitude modulator 40. A transmit reference oscillator 42 is also connected to the phase/amplitude modulator 40 for providing a data transmit reference signal to the phase/amplitude modulator 40 for use as a carrier signal. The phase and amplitude of the data reference signals are modulated in accordance with the output signal (waveform D) of the analog switch 36. Whenever waveform D is above zero, the phase of the output signal, i.e., the modulated data reference signal, of the phase/amplitude modulator 40 is in one direction. On the other hand, whenever waveform D is below zero, the phase is reversed by 180°. Thus, for the waveforms C and D shown in FIG. 4, the binary value 1 is represented by the phase shift or transition of the output (waveform E) of the phase/amplitude modulator 40.

In addition, the amplitude of the data reference signal of the phase/amplitude modulator 40 is also modulated by waveform D of the analog switch 36. The combination of amplitude modulation and phase modulation narrows the overall bandwidth of the phase/amplitude modulator 40. Thus, phase modulation indicates the binary value of the digital information signal and amplitude modulation controls the overall bandwidth of the modulated data reference signal generated by the phase/amplitude modulator 40. The resulting waveform, which is shown as waveform E in FIG. 4, contains a gross phase transition at each half cycle of the analog switch output (waveform D) which represents the binary value 1 of the digital information signal. In addition, as is apparent from an examination of waveform E, the amplitude of this waveform is dependent upon the amplitude of the analog switch output of waveform D.

The phase/amplitude modulator 40 is a conventional unit which can be made by the combination of a phase changer, an amplitude modulator, a gain control amplifier and an operation amplifier in a manner generally known to those skilled in the art. In the preferred embodiment, the functions of the phase/amplifier modulator 40 and the transmit reference oscillator 42 are performed by a monolithic function generator XR-2206 manufactured by Exar Corporation. The output waveforms of this function generator can be both amplitude and frequency modulated by an external voltage.

Figure 5:
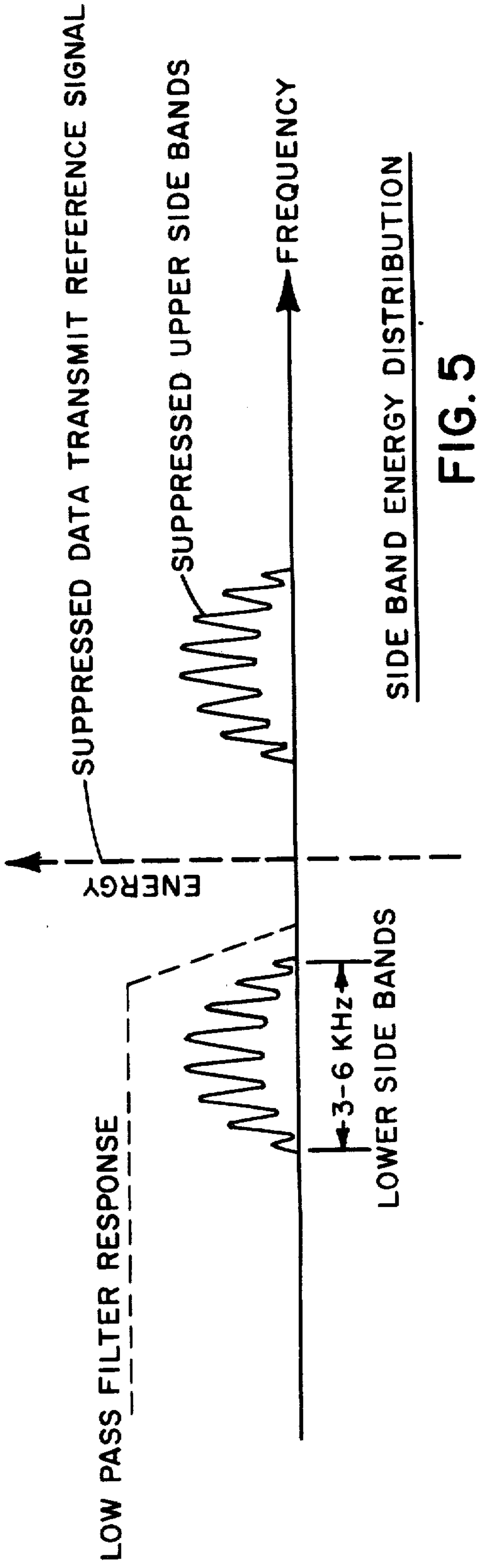
FIG. 5 illustrates the energy distribution of the modulated data reference signal generated by the data source of FIG. 3.

The energy distribution of the modulated data reference signal is shown in FIG. 5. In the preferred embodiment, the transmit reference oscillator generates a data transmit reference signal of approximately 11 KHz and the data clock rate is approximately 2.6 KHz. This relationship between the data transmit reference signal and the data clock signal generates lower sidebands in the range of 3-6 KHz. The upper sidebands and the data transmit reference signal are subsequently suppressed as described in further detail below. Of course, the use of different relationships between the data transmit reference signal and the data clock signal would be apparent to those skilled in the art.

Figure 6:
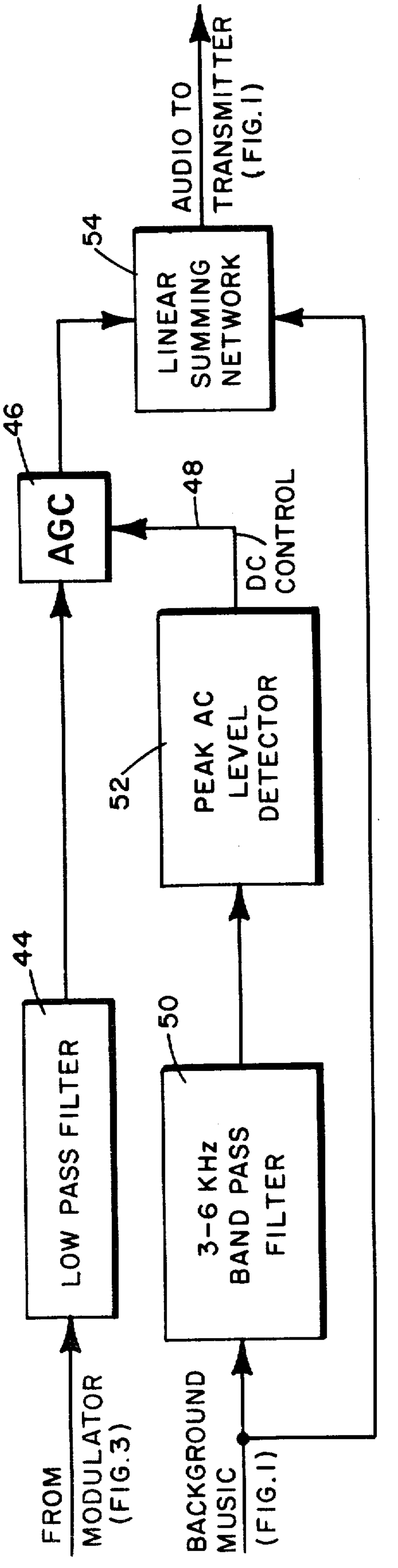
FIG. 6 is a block diagram of the summing circuit shown in FIG. 1.

Turning now to the summing circuit shown in FIG. 6, this summing circuit 16 combines the modulated data reference signal and the auxiliary audio program for subsequent transmission on the FM subcarrier. The summing circuit 16 includes a low pass filter 44 which receives the modulated data reference signal of waveform E. The response curve of the low pass filter, which is illustrated in FIG. 5, illustrates that the low pass filter 44 suppresses the data transmit reference signal and the upper sidebands of the modulated data reference signal. The output signal of the low pass filter 44 consists only of the lower sidebands of the modulated data reference signal.

The low pass filter 44 couples the lower sidebands of the modulated data reference signal to an automatic gain control (AGC) amplifier 46. The AGC amplifier 46 has a control input 48 which is used to control the gain of the AGC amplifier 46. The control input 48 is responsive to the energy level of the background music signal over the frequency band corresponding to the lower sidebands of the modulated data reference signal. The background music signal is coupled to a band pass filter 50 which, in the preferred embodiment, passes the background music signal in the frequency range 3-6 KHz.

The output of the band pass filter 50 is connected to a conventional peak AC level detector which generates a DC control signal which is coupled to the control input 48 of the AGC amplifier 46 to control the gain of the AGC amplifier 46. As a result of the above arrangement of elements, the total energy of the lower sidebands of the modulated data reference signal is maintained in a proper relationship with the energy of a corresponding frequency band of the background music signal.

The output of the AGC amplifier 46, as well as the auxiliary audio program or background music signal, is connected to a linear summing network 54. The linear summing network 54, which is a conventional element, adds the amplitude adjusted lower sidebands of the modulated data reference signal to the background music signal. By adjusting the amplitude of the lower sidebands of the modulated data reference signal in the AGC amplifier 46 and combining this amplitude adjusted signal with the background music signal in the linear summing network 54, no significant deleterious effect on the audio transmission occurs. The output of the linear summing network 54 is connected to the subcarrier generator 13 as shown in FIG. 1.

At the receiver unit, as shown in FIG. 2, the received signal including the background music signal and the data signal is coupled to the data receiver 25. The data receiver 25, as shown in detail in FIG. 7, includes a band pass filter 60 which has a pass band of 3-6 KHz corresponding to the lower sidebands of the modulated data reference signal. The output of the band pass filter 60 is combined in the linear summing network 62 with a reference signal generated by a receiver reference oscillator 64. The frequency of the receiver reference oscillator 64 is approximately the same as the frequency of the transmit reference oscillator 42 of the data source 15. That is, in the preferred embodiment, the frequency of the receiver reference oscillator 64 is approximately 11 KHz. Although the frequency of this reference signal is reasonably close to the frequency of the transmit reference oscillator 42, it is not necessary for the receiver reference oscillator 64 to be synchronous with or locked in any fashion to the transmitter reference oscillator 42.

The linear summing network 62 provides a resistive mix of the incoming audio signal in the frequency range of 3-6 KHz against the reference signal of 11 KHz. The output of the linear summing network 62 is connected to a low pass filter 64 which eliminates the reference signal. A data detector 66 is connected to the output of the low pass filter 64 for detecting the phase transition information necessary to regenerate the digital information signal transmitted by the transmitter unit of FIG. 1. The data detector 66, which is a slightly modified AM detector, generates a positive and negative threshold so that the output of the data detector duplicates the original square wave digital information signal shown as waveform C in FIG. 4. In the preferred embodiment, the data detector is a voltage comparator such as the LM3302 manufactured by National Semiconductor, Inc. The LM3302 voltage comparator performs a slow comparison of the output signals passed by the low pass filter 64 by rejecting individual sine waves and accepting groups of sine waves. In this manner, the LM3302 voltage comparator generates an envelope from the output signal of the low pass filter 64 and squares this envelope to provide a digital information signal such as waveform C in FIG. 4. The output of the data detector 66 is connected to conventional digital circuits to regenerate the parallel or serial structure of the transmitted digital information signal.

The operation of the FM broadcasting system of the present invention is apparent from the above description. The digital information signal is first used to generate the analog type signal shown as waveform D in FIG. 4 in which a full cycle of the data clock signal of waveform A represents one or the other of the binary values of the digital information signal. The analog type signal is used by the phase/amplitude modulator 40 to modulate the phase and amplitude of a data transmit reference signal. The phase transition of the modulated data reference signal represents the binary value of the digital information signal. The lower sidebands of the modulated date reference signals are then amplitude adjusted by the automatic gain control amplifier 46 in relation to the amplitude of the corresponding frequency band of the background music signal. This amplitude adjusted signal is linearly combined with the background music signal and coupled to the subcarrier generator 13 and the FM transmitter 10 for transmission to the FM receiver unit of FIG. 2. The FM receiver unit includes a data receiver 25 which detects the relevant frequency band and combines the received data signal with a reference signal corresponding to the data transmit reference signal of the data source 15. After the linear combination of these signals is passed through the low pass filter 64, the the phase transitions which represent the transmitted digital information can be detected by the data detector 66 to generate a digital information signal corresponding to waveform C of FIG. 4. Conventional digital circuit techniques then are used to place the digital information signal in the desired parallel or serial form.

While several specific embodiments of the principles of the present invention are illustrated in the accompanying drawings and described in detail in the above specifications, it is to be understood that changes may be made in such embodiments without departing from the scope and spirit of the present invention. The scope of the present invention is only limited as defined in the appended claims. For example, it is to be understood that the present invention is not limited to the specific frequency bands and carrier frequencies set forth above. Also, it is to be understood that the present invention is not limited to the particular semiconductor circuits used in the preferred embodiment to form the data source 15 and the data detector 66 of the data receiver 25. Integrated circuits such as described in the above specification or discrete components can be used to perform the functions of the various blocks in the block diagrams. These and other modifications may be made by one of ordinary skill in the art without departing from the principles of the present invention.

I claim:

1. An FM broadcasting system comprising:

main transmission means for transmitting a main program on an FM channel carrier;

auxiliary transmission means associated with said main transmission means for transmitting an auxiliary audio program on subcarriers of the FM channel carrier;

data means associated with said auxiliary transmission means for adding a data signal to the auxiliary audio program so that said auxiliary transmission means can simultaneously transmit the data signal and the auxiliary audio program on the same subcarriers of the FM channel carrier without interruption of the transmission of either the data signal or the auxiliary audio program; and receiving means for receiving at least one of the main program, the auxiliary audio program and the data signal.

2. An FM broadcasting system according to claim 1 wherein the data signal is a binary digital signal and said data means comprises:

oscillation means for generating a data reference signal; and modulation means connected to said oscillation means for generating a modulated data reference signal by modulating the data reference signal in accordance with the binary digital signal, wherein said modulation means modulates the phase of the data reference signal to indicate the binary value of the binary digital signal by the phase transition of the modulated data reference signal.

3. An FM broadcasting system according to claim 2 wherein the modulated data reference signal has both upper and lower sidebands, said data means further comprising:

low pass filter means connected to said modulation means for passing only the lower sidebands of the modulated data reference signal and suppressing both the data reference signal and the upper sidebands of the modulated data reference signal, said amplitude adjusting means being connected to said low pass filter means for adjusting the amplitude of the lower sidebands of the modulated data reference signal and said linear summing means summing the auxiliary audio program and the lower sidebands of the modulated data reference signal.

4. An FM broadcasting system according to claim 3 wherein said amplitude adjusting means comprises:

a band pass filter having an input connected to receive the auxiliary audio program, said band pass filter having a frequency range corresponding to the lower sidebands of the modulated data reference signal;

a peak AC level detector connected to said band pass filter to generate a DC signal corresponding to the instantaneous AC level of the frequency band of the auxiliary audio program passed by said band pass filter; and an automatic gain control amplifier having a control input connected to receive the DC signal generated by said peak AC level detector to automatically vary the gain of said automatic gain control amplifier, said automatic gain control amplifier being further connected to said low pass filter means to receive the lower sidebands of the modulated data reference signal to thereby adjust the amplification of the lower sidebands in response to the DC signal generated by said peak AC level detector, said automatic gain control amplifier having an output connected to said summing means.

5. An FM broadcasting system according to claim 4 wherein both the lower sidebands of the modulated data reference signal and the frequency band of said band pass filter are in the range of 3–6 KHz.

6. An FM broadcasting system according to claim 4 wherein said receiving means receives an audio signal containing both the auxiliary audio program and the modulated data reference signal, said receiving means comprising data receiving means for receiving the audio signal, said data receiving means including:

a band pass filter having an input coupled to receive the audio signal, said band pass filter having a frequency range corresponding to the lower sidebands of the modulated data reference signal transmitted by said data means;

a receiver reference oscillator for generating a receiver reference signal corresponding substantially to the data reference signal of said data means;

a linear summing network having inputs connected to the outputs of said band pass filter and said receiver reference oscillator for summing the receiver reference signal and the output signal of said band pass filter;

a low pass filter connected to the output of said linear summing network to suppress the receiver reference signal; and a data detector connected to said low pass filter to generate a binary digital signal corresponding to the binary digital signal transmitted by said data means.

7. An FM broadcasting system comprising:

main transmission means for transmitting a main program on an FM channel carrier;

auxiliary transmission means associated with said main transmission means for transmitting an auxiliary audio program on subcarriers of the FM channel carrier;

data means associated with said auxiliary transmission means for adding a binary digital signal in serial form with a predetermined bit rate to the auxiliary audio program so that said auxiliary transmission means can simultaneously transmit the binary digital signal and the auxiliary audio program on the same subcarriers of the FM channel carrier, said data means comprising oscillation means for generating a data reference signal, modulation means connected to said oscillation means for generating a modulated data reference signal by modulating the data reference signal in accordance with the binary digital signal, wherein said modulation means modulates the phase of the data reference signal to indicate the binary value of the binary digital signal by the phase transition of the modulated data reference signal, data clock means for generating a clock signal having a cycle corresponding to the bit rate of the binary digital signal and analog switch means having an input connected to said data clock means and a control gate coupled to the binary digital signal for selectively blocking individual cycles of the clock signal in response to the binary values of the binary digital signal, the output of said analog switch means being connected to said modulation means; and receiving means for receiving at least one of the main program, the auxiliary audio program and the data signal.

8. An FM broadcasting system according to claim 7 wherein the clock signal is a sinusoidal signal of approximately 2.6 KHz and the data reference signal is approximately 11 KHz to thereby generate lower sidebands of the modulated data reference signal of approximately 3–6 KHz.

9. An FM broadcasting system according to claim 7 wherein the output signal of said analog switch means corresponds to the binary digital signal except that a full cycle of the clock signal represents each occurrence of one of the binary values of the binary digital signal and said modulation means phase modulates the data carrier signal in accordance with the half cycle phase shift of the output signal of said analog switch means.

10. An FM broadcasting system comprising:

main transmission means for transmitting a main program on an FM channel carrier;

auxiliary transmission means associated with said main transmission means for transmitting an auxiliary audio program on subcarriers of the FM channel carrier;

data means associated with said auxiliary transmission means for adding a binary digital signal in a parallel form with a predetermined bit rate to the auxiliary audio program so that said auxiliary transmission means can simultaneously transmit the binary digital signal and the auxiliary audio program on the same subcarriers of the FM channel carrier, said data means comprising oscillation means for generating a data reference signal, modulation means connected to said oscillation means for generating a modulated data reference signal by modulating the data reference signal in accordance with the binary digital signal, wherein said modulation means modulates the phase of the data reference signal to indicate the binary value of the binary digital signal by the phase transition of the modulated data reference signal, data clock means for generating a clock signal having a cycle corresponding to the bit rate of the binary digital signal, converter means coupled to receive the binary digital signal for converting the binary digital signal from serial to parallel form and analog switch means connected to said data clock means and a control gate coupled to said converter means for selectively blocking individual cycles of the clock signal in response to the binary values of the binary digital signal, the output of said analog switch means being connected to said modulation means; and receiving means for receiving at least one of the main program, the auxiliary audio program and the data signal.

11. In a broadcasting system for transmitting a main program on a channel carrier and an auxiliary audio program such as background music on subcarriers of the channel carrier, data transmission means for transmitting a data signal simultaneously with the auxiliary audio program on the same subcarriers of the channel carrier without interruption of the transmission of either the data signal or the auxiliary audio program.

12. The broadcasting system according to claim 11 wherein said broadcasting system is FM.

13. The broadcasting system according to claim 11 wherein the subcarriers of the channel carrier which transmit the auxiliary audio program and the data signal are in the SCA band.

14. The broadcasting system according to claim 11 wherein the data signal transmitted by said data transmission means is a binary digital signal in serial form.

15. The broadcasting system according to claim 11 wherein the data signal transmitted by said data transmission means is a binary digital signal in parallel form.

16. The broadcasting system according to claim 11 wherein said data transmission means comprises reference means for generating a data reference signal and modulation means for modulating the data reference signal in accordance with the data signal.

17. The broadcasting system according to claim 16 wherein said modulation means comprises a single sideband suppressed carrier modulator which generates a single sideband modulated data signal.

18. The broadcasting system according to claim 16 or 17 wherein the data signal is a binary digital signal and said modulation means comprises a phase/amplitude modulator for modulating the phase and amplitude of the data reference signal in accordance with the data signal, wherein the binary values of the binary digital signal are represented by the phase transition of the modulated data reference signal.

19. In a broadcasting system for transmitting a main program on a channel carrier and an auxiliary audio program such as background music on subcarriers on the channel carrier, data transmission means for transmitting a data signal simultaneously with the auxiliary audio program on the same subcarriers of the channel carrier, said data transmission means comprising reference means for generating a data reference signal and modulation means for modulating the data reference signal in accordance with the data signal, the data signal being a binary digital signal and said modulation means comprising a phase/amplitude modulator for modulating the phase and amplitude of the data reference signal in accordance with the data signal, wherein the binary values of the binary digital signal are represented by the phase transition of the modulated data reference signal, said data transmission means further comprising:

amplitude adjusting means for adjusting the amplitude of the modulated data reference signal in relation to the amplitude of a corresponding frequency range of the auxiliary audio program and summing means having one input connected to said amplitude adjusting means for summing the amplitude adjusted signal generated by said amplitude adjusting means and another input connected to receive the auxiliary audio program, wherein said summing means generates an output signal which modulates the subcarriers of the channel carrier.

20. In an FM broadcasting system for transmitting a main program on an FM channel carrier and an auxiliary audio program such as background music on subcarriers of the FM channel carrier, the method comprising the steps of:

combining a data signal with the auxiliary audio program by adding the data signal to the auxiliary audio program; and transmitting the combined data signal and auxiliary audio program simultaneously on the same subcarriers of the FM channel carrier without interruption of the transmission of either the data signal or the auxiliary audio program.

21. The method of claim 20 wherein the data signal is a binary digital signal, the method further comprising the steps of:

generating a data transmit reference signal; and modulating the phase of the data transmit reference signal in accordance with the binary values of the binary digital signal to generate a modulated data reference signal, wherein said step of combining the data signal and the auxiliary audio program comprises adding together the modulated data reference signal and the auxiliary audio program.

22. In an FM broadcasting system for transmitting a main program on an FM channel carrier and an auxiliary audio program such as background music on subcarriers of the FM channel carrier, the method comprising the steps of:

generating a data reference signal;

modulating the phase of the data reference signal in accordance with the binary values of a binary digital signal to generate a modulated data reference signal;

adjusting the amplitude of the modulated data reference signal in relation to the amplitude of a corresponding frequency range of the auxiliary audio program;

combining the binary digital signal with the auxiliary audio program by adding the adjusted modulated data reference signal to the auxiliary audio program; and;

transmitting the combined binary digital signal and auxiliary audio program simultaneously on the same subcarriers of the FM channel carrier.

23. An FM broadcasting system comprising:

main transmission means for transmitting a main program on an FM channel carrier;

auxiliary transmission means associated with said main transmission means for transmitting an auxiliary audio program on subcarriers of the FM channel carrier;

data means associated with said auxiliary transmission means for adding a binary digital signal to the auxiliary audio program so that said auxiliary transmission means can simultaneously transmit the binary digital signal and the auxiliary audio program on the same subcarriers of the FM channel carrier, said data means comprising oscillation means for generating a data reference signal, modulation means connected to said oscillation means for generating a modulated data reference signal by modulating the data reference signal in accordance with the binary digital signal, wherein said modulation means modulates the phase of the data reference signal to indicate the binary value of the binary digital signal by the phase transition of the modulated data reference signal, amplitude adjusting means coupled to said modulation means for adjusting the amplitude of the modulated data reference signal in response to the amplitude of a corresponding frequency band of the auxiliary audio program and linear summing means having one input connected to said amplitude adjusting means and another input connected to receive the auxiliary audio program for linearly summing the auxiliary audio program and the modulated data reference signal is transmitted by said auxiliary transmission means over the subcarrier of the FM channel carrier; and receiving means for receiving at least one of the main program, the auxiliary audio program and the binary digital signal.

* * * * *